(12) United States Patent
Watanabe

(10) Patent No.: US 6,775,257 B1
(45) Date of Patent: Aug. 10, 2004

(54) PACKET-TRANSMITTING SYSTEM

(75) Inventor: Eiichi Watanabe, Kawasaki (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 669 days.

(21) Appl. No.: 09/664,852

(22) Filed: Sep. 19, 2000

(30) Foreign Application Priority Data

Nov. 29, 1999 (JP) .......................................... 11-337404

(51) Int. Cl.$^7$ ............................................ H04B 7/216
(52) U.S. Cl. ...................... 370/335; 370/280; 370/320; 370/336; 370/345; 370/431; 370/438; 386/12; 455/3.02; 455/130; 455/133; 725/9; 725/20; 725/25; 725/31; 725/63; 725/72
(58) Field of Search ................. 370/280, 320, 370/335, 336, 345, 431, 438, 441; 386/12; 455/3.02, 130, 133; 725/9, 20, 25–31, 63–72, 143, 149

(56) References Cited

U.S. PATENT DOCUMENTS 5,790,937 A   8/1998 Gutle
6,078,576 A * 6/2000 Schilling et al. ............ 370/347
6,404,818 B1 * 6/2002 Obikane ................ 375/240.28

FOREIGN PATENT DOCUMENTS

EP   0 855 840   7/1998
WO   WO 94/18763   8/1994

* cited by examiner

Primary Examiner—Wellington Chin
Assistant Examiner—John Shew
(74) Attorney, Agent, or Firm—Oblon, Spivak, McClelland, Maier & Neustadt, P.C.

(57) ABSTRACT

A packet-transmitting system comprising a transmitter and a receiver. In the transmitter, the packet-allocating circuit receives a stream of packets. The circuit allocates the packets having PIDs $a_1$ to $b_1$ to the transmission channel #1, the packets having PIDs $a_2$ to $b_2$ to the transmission channel #2, and so forth. The circuit allocates the packets having PIDs $a_N$ to $b_N$ to the last transmission channel #N. The control-data generating circuit time-divides and multiplexes packet-group data (groups of PIDs) representing the groups of packets to be transmitted via the channels #1 to #N, thereby generating control data to be transmitted through the transmission channel #0. The packets in the channels #0 to #N are multiplexed by a CDM system. In the receiver, the groups of packets, transmitted via the channels #1 to "N, are recognized from the control data transmitted via the channel #0, and only the signals transmitted via the channel designated by a user are extracted and reproduced. Thus, the receiver can therefore receive only the packet the user desires.

9 Claims, 12 Drawing Sheets

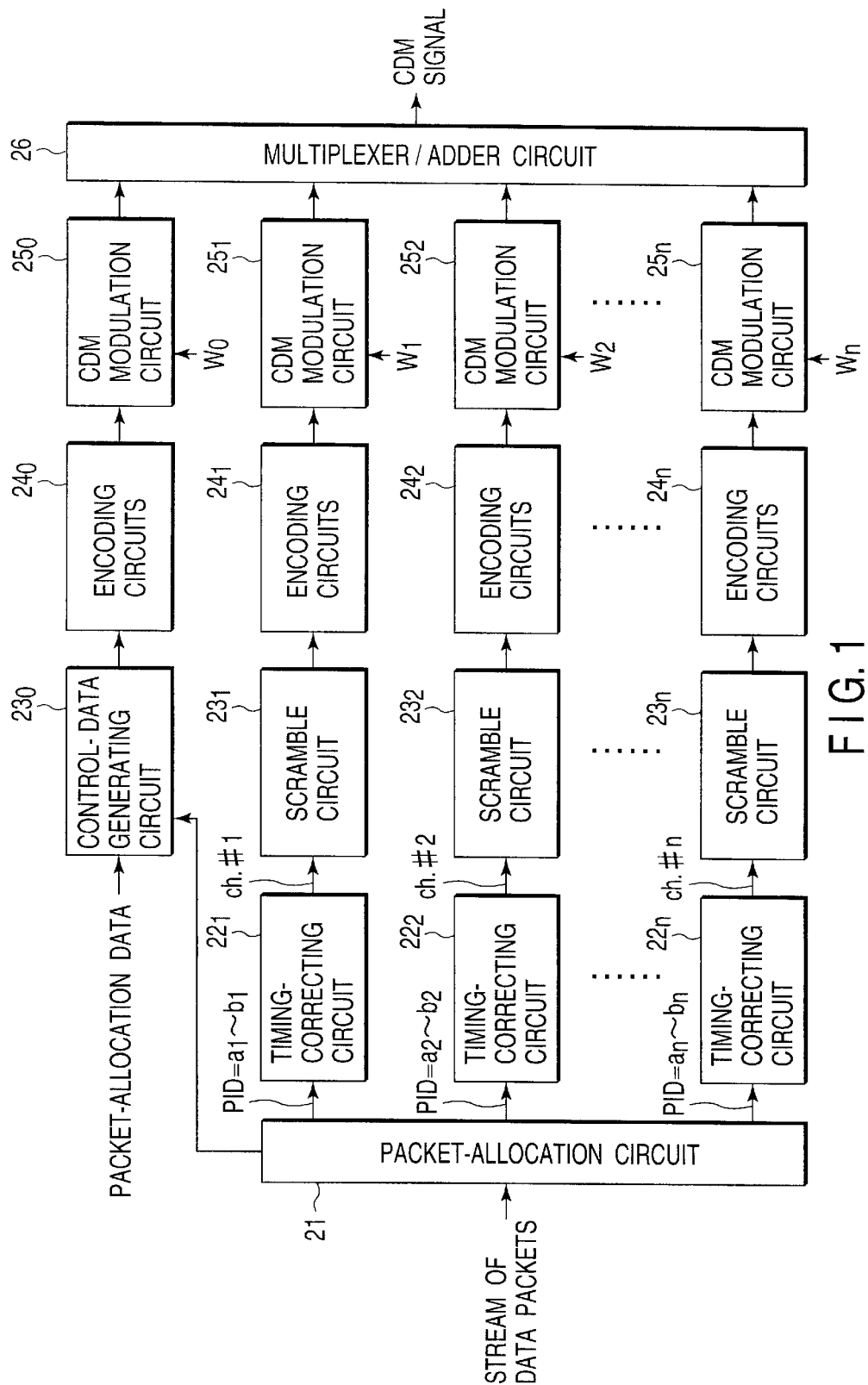
F I G. 1

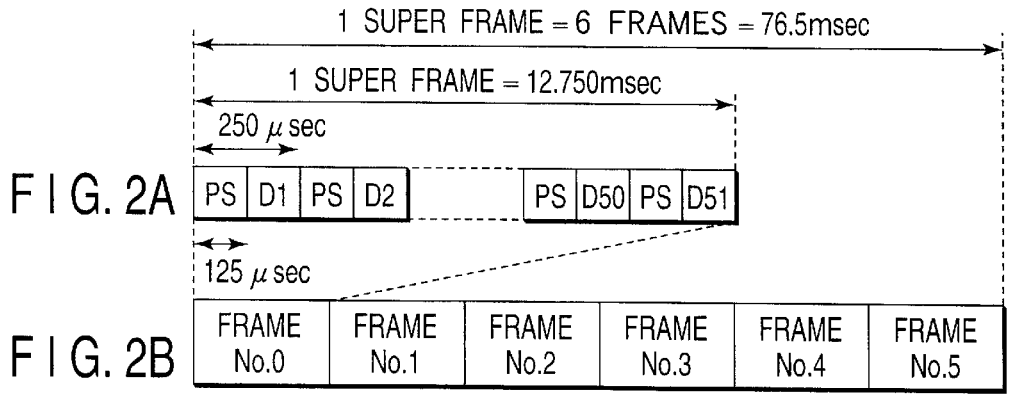
FIG. 2A
FIG. 2B
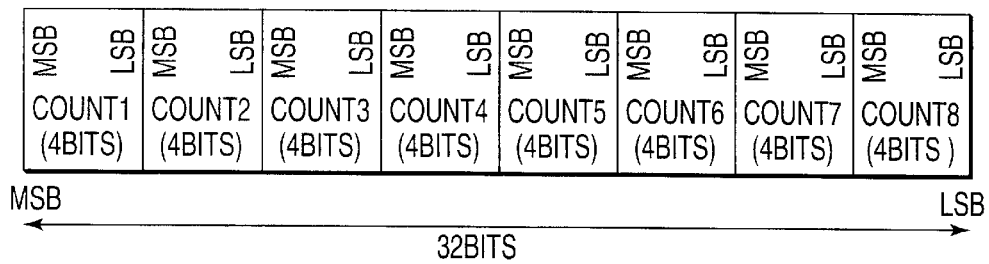
FIG. 3
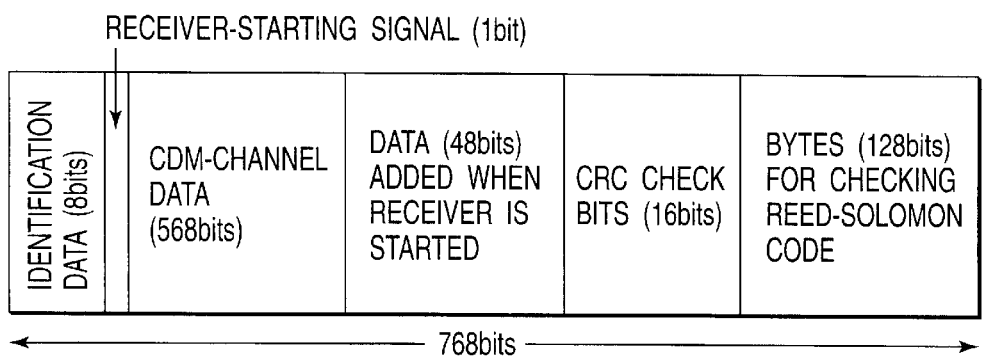
FIG. 4

| IDENTIFI-CATION DATA | ※ | CDM CHANNEL-CONFIGURATION DATA (#1~#10) | DATA ADDED AT THE START OF RECEIVER | CRC CHECK BITS | BYTES FOR CHECKING RS CODE |
|---|---|---|---|---|---|
| IDENTIFI-CATION DATA | ※ | CDM CHANNEL-CONFIGURATION DATA (#11~#20) | DATA ADDED AT THE START OF RECEIVER | CRC CHECK BITS | BYTES FOR CHECKING RS CODE |
| IDENTIFI-CATION DATA | ※ | CDM CHANNEL-CONFIGURATION DATA (#21~#30) | DATA ADDED AT THE START OF RECEIVER | CRC CHECK BITS | BYTES FOR CHECKING RS CODE |
| IDENTIFI-CATION DATA | ※ | CDM CHANNEL-CONFIGURATION DATA (#31~#40) | DATA ADDED AT THE START OF RECEIVER | CRC CHECK BITS | BYTES FOR CHECKING RS CODE |
| IDENTIFI-CATION DATA | ※ | CDM CHANNEL-CONFIGURATION DATA (#41~#50) | DATA ADDED AT THE START OF RECEIVER | CRC CHECK BITS | BYTES FOR CHECKING RS CODE |
| IDENTIFI-CATION DATA | ※ | CDM CHANNEL-CONFIGURATION DATA (#51~#60) | DATA ADDED AT THE START OF RECEIVER | CRC CHECK BITS | BYTES FOR CHECKING RS CODE |
| IDENTIFI-CATION DATA | ※ | CDM CHANNEL-CONFIGURATION DATA (#61~#63) | DATA ADDED AT THE START OF RECEIVER | CRC CHECK BITS | BYTES FOR CHECKING RS CODE |
| IDENTIFI-CATION DATA | ※ | EXTENSION DATA | | CRC CHECK BITS | BYTES FOR CHECKING RS CODE |
| IDENTIFI-CATION DATA | ※ | EXTENSION DATA | | CRC CHECK BITS | BYTES FOR CHECKING RS CODE |
| IDENTIFI-CATION DATA | ※ | EXTENSION DATA | | CRC CHECK BITS | BYTES FOR CHECKING RS CODE |
| IDENTIFI-CATION DATA | ※ | EXTENSION DATA | | CRC CHECK BITS | BYTES FOR CHECKING RS CODE |
| IDENTIFI-CATION DATA | ※ | EXTENSION DATA | | CRC CHECK BITS | BYTES FOR CHECKING RS CODE |

FIG. 8

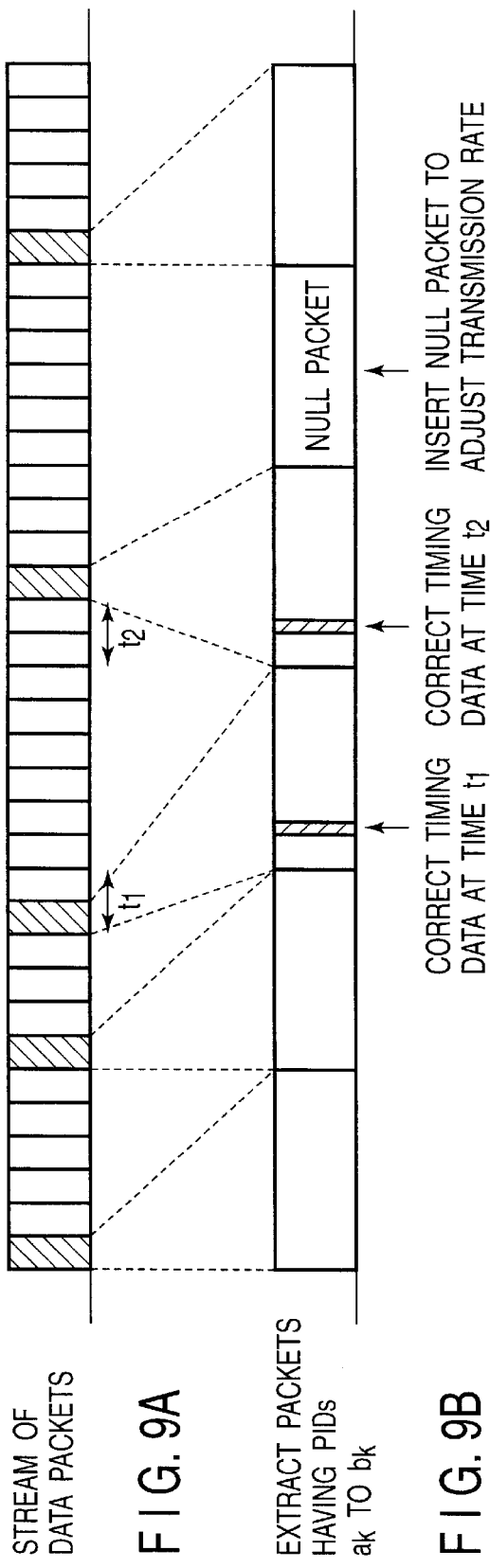

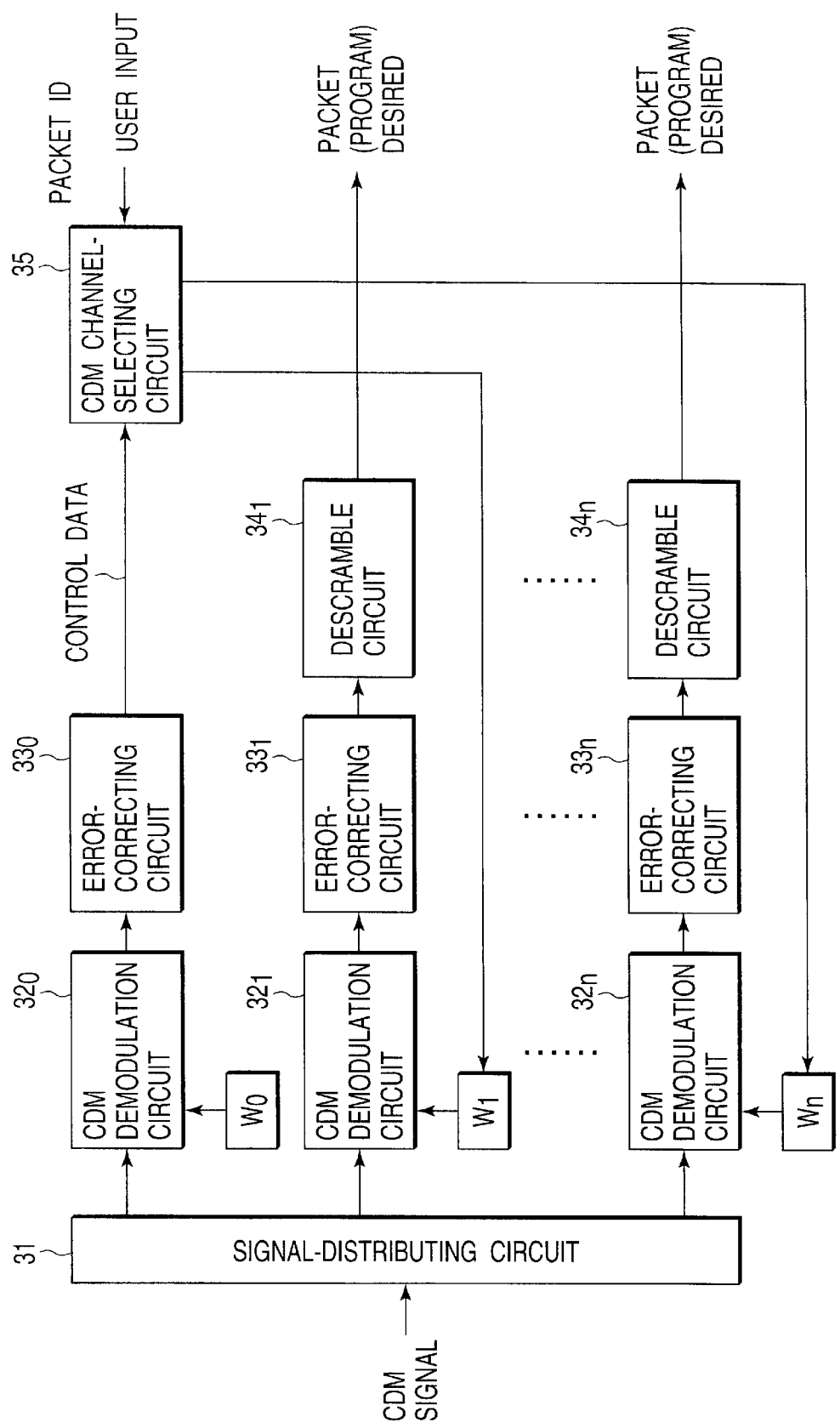
F I G. 10

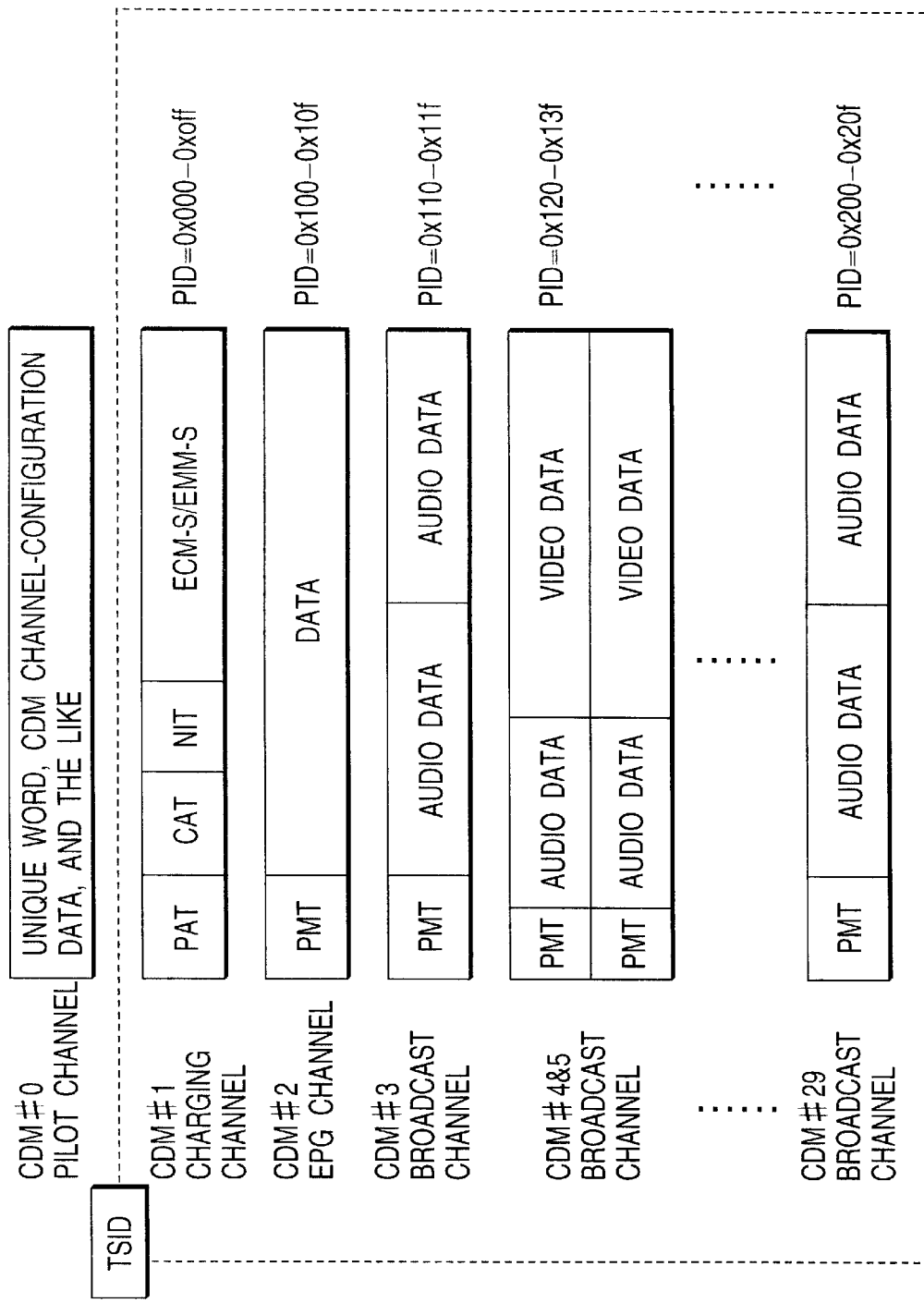
F I G. 14

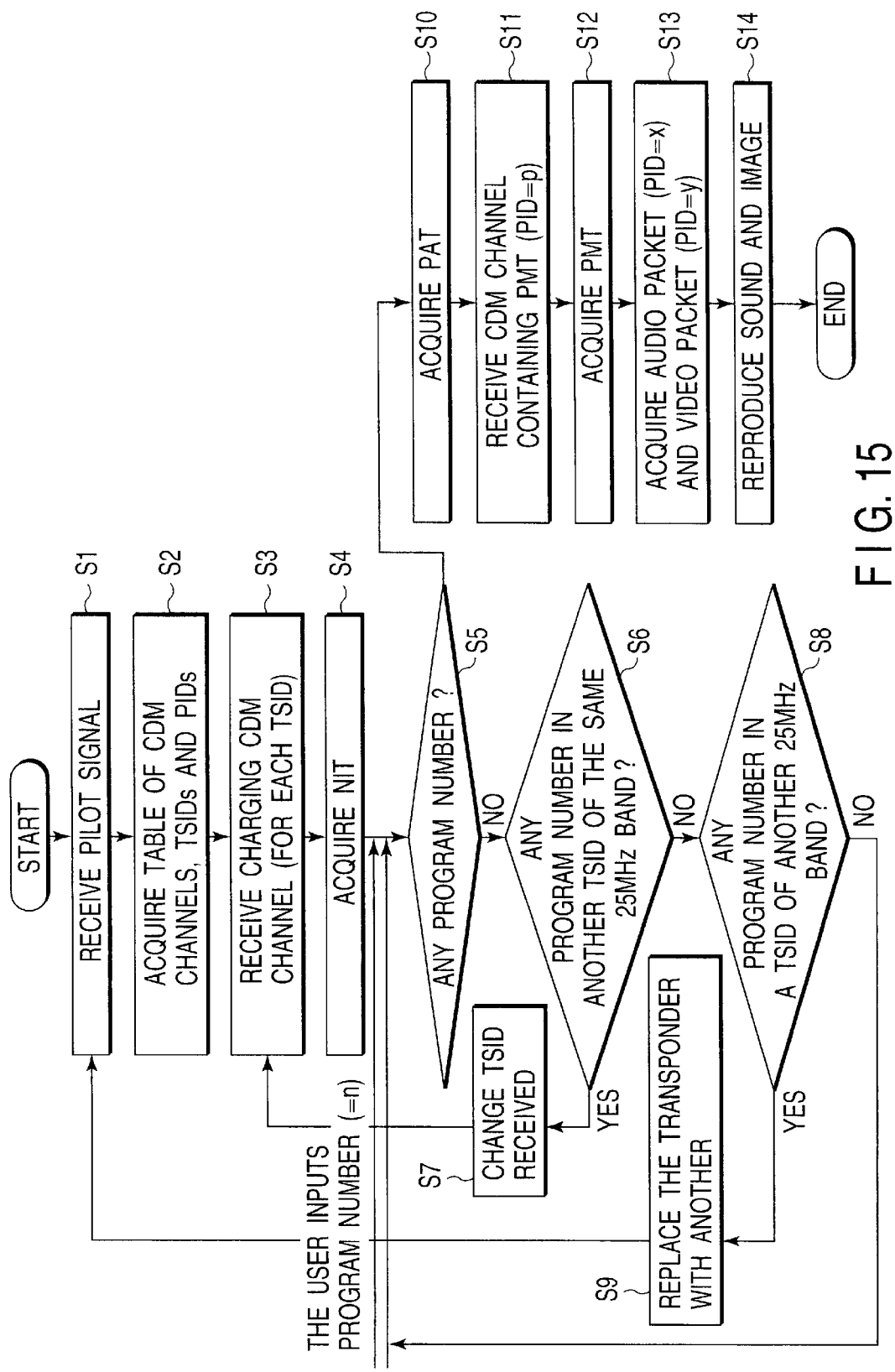
F I G. 15

TABLE

F I G. 16A
CDM#1 TSID-1, PID=0~1f
CDM#2 TSID-2, PID=100~10f
....

PAT(0x000)

F I G. 16B
PMT OF PROGRAM No.1:PID=q
PMT OF PROGRAM No.n:PID=q
....

NIT(0x0010)

F I G. 16C
IN AND TSID OF NETWORK
PROGRAM No.a, PROGRAM No.b,
············PROGRAM No.z

PMT

F I G. 16D
PROGRAM No.
   AUDIO:PID=x
   VIDEO:PID=y

# PACKET-TRANSMITTING SYSTEM

CROSS-REFERENCE TO RELATED APPLICATIONS

This application is based upon and claims the benefit of priority from the prior Japanese Patent Application No. 11-337404, filed Nov. 29, 1999, the entire contents of which are incorporated herein by reference.

BACKGROUND OF THE INVENTION

The present invention relates to a packet-transmitting system for performing code-division multiplexing on a stream of data packets and parallel transmission of data packets.

A packet-transmitting system is known which comprises a transmitting station and a receiving station. In the transmitting station, error-correction codes are added to a stream to data packets, and the data packets are modulated and transmitted from the antenna. In the receiving station, the antenna receives signals of all bands. The signals are demodulated and subjected to error correction, thereby reproducing the data packets. The packets are supplied to a packet-selecting circuit, which selects the packets having the ID the user has designated.

Recently, digital broadcasting employing the conventional packet-transmitting system has been developed to broadcast a plurality of programs at the same time. In the packet-transmitting system, the programs are transmitted in the form of a stream of data packets from the transmitting station to the receivers. At each receiver, the user can enjoy only one program at a time in most cases. Nonetheless, the receiver receives all data packets and processes them all. To process many data packets, the receiver must have a large-scale circuit configuration and consume much power. This inevitably increases the manufacturing and running costs of the receiver.

There is another problem with the conventional packet-transmitting system. Since all packets are modulated altogether, the parameters of error- correction codes or the characteristics of signals cannot be changed for each packet (program). Hence, the conventional packet-transmitting system cannot accomplish broadcasting in various manners desired.

BRIEF SUMMARY OF THE INVENTION

The present invention has been made in view of the foregoing. The object of the invention is to provide a packet-transmitting system in which the receiver receives only the packet the user needs and the parameters of error-correction codes or the characteristics of signals can be changed for each packet (program) to achieve broadcasting in various manners desired.

(1) To achieve the object, a packet-transmitting system has at least one control-signal transmission channel and a plurality of data-signal transmission channels. The system comprises a transmitter apparatus and a receiver apparatus. The transmitter apparatus includes: packet-allocating section for receiving a stream of packets and allocating groups of packets to the data-signal transmission channels; time-dividing/multiplexing section for receiving packet-group data representing the packets allocated to each data-signal transmission channel by the section and for time-dividing and multiplexing the packet-group data to the control-signal transmission channel; and multiplexer/adder section for multiplexing a signal in the control-signal transmission channel and signals in the data-signal transmission channels in parallel, thereby to generate signals to be transmitted. The receiver apparatus includes: signal-distributing section for distributing the signals to a plurality of channels; group-data acquiring section for reproducing the signal in the data-signal transmission channel from a signal distributed to any channel by the signal-distributing section, thereby to acquire group data about the data-signal transmission channels; channel-selecting section for selecting a data-signal transmission channel to which a packet group designated is allocated, in accordance with the group data acquired by the group-data acquiring section; and selected-channel reproducing section for reproducing a signal in the data-signal transmission channel selected by the channel-selecting section, from the signals in some of the transmission channels to which the signal-distributing section has distributed the signals and for extracting only the packets of the group designated, the signals in some transmission channels not having been used in the group-data acquiring section.

(2) In the packet-transmitting system described in the paragraph (1), the packet-allocating section may allocate the packets of the same group to a plurality of data-signal transmission channels, and the time-dividing/multiplexing section may time-divide and multiplex the packets thus allocated, as the packet-group data, to the control-signal transmission channel.

(3) In the packet-transmitting system described in the paragraph (1), the group data may represent packet identifiers that the packets have.

(4) In the packet-transmitting system described in the paragraph (1), the multiplexer/adder section may multiplex the signal in the control-signal transmission channel and the signals in the data-signal transmission channels, by section of a code dividing/multiplexing system.

(5) In the packet-transmitting system described in the paragraph (1), the transmitter apparatus may comprise time-management data correcting section for finding a difference between the timing of each packet to be allocated by the packet-allocating section and the timing of the same packet allocated by the packet-allocating section, and for correcting time-management data contained in the packet, in accordance with the difference.

(6) In the packet-transmitting system described in the paragraph (1), the transmitter apparatus may comprise scramble section for scrambling the packets in the data-signal transmission channels and time-dividing a scramble key to one of the data-signal transmission channels.

(7) In the packet-transmitting system described in the paragraph (6), the scramble section may eliminate a difference between a signal delay in the transmission channel for transmitting the scramble key and a signal delay in the transmission channels for transmitting the packets, before the scramble key and packets are transmitted.

(8) According to this invention there is provided a transmitter apparatus for use in a packet-transmitting system having at least one control-signal transmission channel and a plurality of data-signal transmission channels. The transmitter apparatus comprises: packet-allocating section for receiving a stream of packets and allocating groups of packets to the data-signal transmission channels; time-dividing/multiplexing section for receiving packet-group data representing the packets allocated to each data-signal transmission channel by the packet-allocating section and for time-dividing and multiplexing the packet-group data to the control-signal transmission channel; and multiplexer/adder section for multiplexing a signal in the control-signal transmission channel and signals in the data-signal transmission channels in parallel, thereby to generate signals to be transmitted.

(9) According to the present invention there is provided a receiver apparatus for use in a packet-transmitting system having at least one control-signal transmission channel and a plurality of data-signal transmission channels. The receiver apparatus is designed to receive signals generated by allocating groups of packets to the data-signal transmission channels, by time-dividing and multiplexing, the control-signal transmission channel, packet-group data allocated to each of the data-signal transmission, channel and by multiplexing a signal in the control-signal transmission channel and signals in the data-signal transmission channels in parallel. The receiver apparatus comprises: signal-distributing section for distributing the signals to a plurality of channels; group-data acquiring section for reproducing the signal in the data-signal transmission channel from a signal distributed to any channel by the signal-distributing section, thereby to acquire group data about the data-signal transmission channels; channel-selecting section for selecting a data-signal transmission channel to which a packet group designated is allocated, in accordance with the group data acquired by the group-data acquiring section; and selected-channel reproducing section for reproducing a signal in the data-signal transmission channel selected by the channel-selecting section, from the signals in some of the transmission channels to which the signal-distributing section has distributed the signals and for extracting only the packets of the group designated, the signals in some transmission channels not having been used in the group-data acquiring section.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a block diagram showing the transmitter incorporated in a packet-transmitting system according to the present invention;

FIGS. 2A and 2B are diagrams, each illustrating the format of the sync signal used in the packet-transmitting system;

FIG. 3 is a diagram depicting the format of the data transmitted in the region $D_2$ of the sync signal shown in FIG. 2A;

FIG. 4 is a diagram showing a part of the data transmitted in the regions $D_3$ to $D_{50}$ of the sync signal illustrated in FIG. 2A;

FIG. 8 is a diagram depicting one super frame contained in the sync signal illustrated in FIG. 2B;

FIGS. 9A and 9B are a timing chart explaining how the timing-correcting circuit shown in FIG. 1 processes a packet;

FIG. 10 is a block diagram of the receiver incorporated in the packet-transmitting system;

FIG. 14 is a diagram showing a stream of MPEG2-T packets allocated to a plurality of CDM transmission channels;

FIG. 15 is a flowchart representing the sequence of selecting a program in the receiver of the packet-transmitting system; and FIGS. 16A to 16D are diagrams illustrating the data items generated in some of the steps shown in FIG. 15.

DETAILED DESCRIPTION OF THE INVENTION

Figure 5:
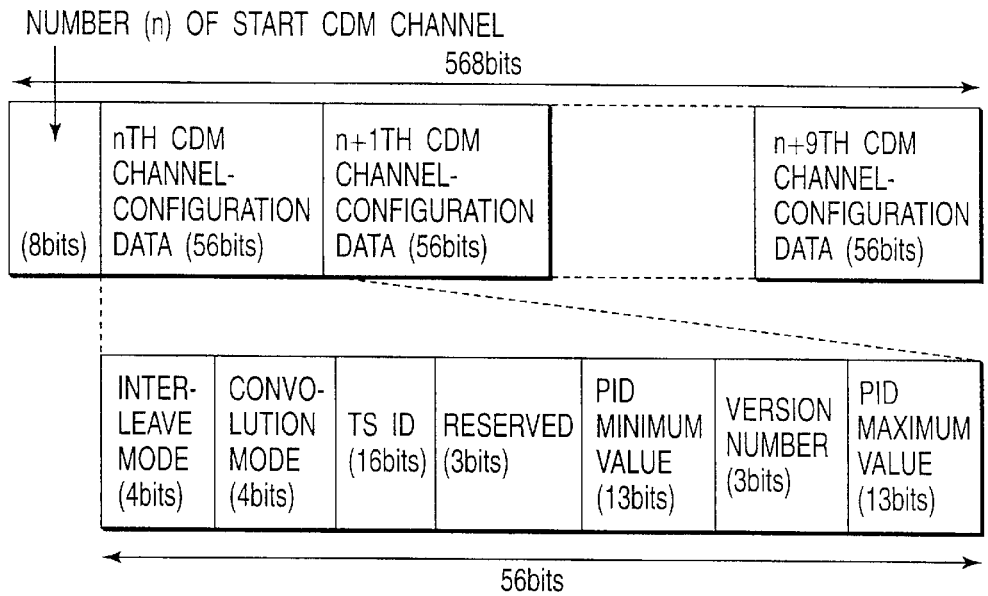
FIG. 5 is a diagram showing an example of CDM-channel data shown in FIG. 4.

An embodiment of the present invention will be described in detail, with reference to the accompanying drawings.

FIG. 1 is a block diagram showing the transmitter incorporated in a packet-transmitting system according to the invention. It is assumed that the data input to the packet-transmitting system is TS (Transport Stream) type that is generally defined in MPEG2 systems. The TS data consists of packets of programs (groups) that are time-divided and multiplexed.

The transmitter has a packet-allocating circuit 21 and a control-data generating circuit $23_0$.

The packet-allocating circuit 21 is designed to receive packets and allocate them to transmission channels in accordance with the packet identifiers (PIDS) of those packet groups designated. More precisely, the circuit 21 allocates the packets identified by PIDS $a_1$ to $b_1$ to the transmission channel #1, the packets identified by PIDs $a_2$ to $b_2$ to the transmission channel #2, and so forth. Thus, the circuit 21 allocates the packets identified by PIDs $a_N$ to $b_N$ to the last transmission channel #N.

The control-data generating circuit $23_0$ is designed to generate parameters, control data and the like to synchronize the transmission channels #1 to #N. (Hereinafter, the parameters, the control data, and the like will be collectively called "control data."The circuit $23_0$ receives the packet-allocation data from the packet-allocating circuit 21. The packet-allocation data shows which packet has been allocated to which transmission channel. The circuit $23_0$ performs time division and multiplexing on the packet-allocation data, generating packet-group data (groups of PIDS) and adding the same to the control data.

The format of the control data will be described, with reference to FIGS. 2A and 2B and FIGS. 3 to 8.

The control data has been generated by time division and multiplexing of pilot symbols (PS) and frequency-diffused modulated signals (D), as is illustrated in FIG. 2A. Each PS is a signal having a length of 125 μsec and modulated every 250 μsec with a sync diffusion code only. Each frequency-diffused modulated signal has been generated by diffusing data (e.g., a parameter) with the same sync diffusion code and has a length of 125 μsec.

As shown in FIG. 2B, 51 pairs, each consisting of one pilot symbol and one frequency-diffused modulated signal, constitute one frame. Every six frames constitute one super frame.

Thus, each frame of the control data is composed of 51 pilot symbols and 51 frequency-diffused modulated signals $D_1$ to $D_{51}$. The signals $D_1$ to $D_{51}$ are of the following types.

The signal $D_1$ is a sync word having a fixed pattern and used to synchronize the frame of the control data. The signal $D_1$ is a frequency-diffused modulated signal that has been generated by diffusing, for example, "0110101011010101100110001010" with the sync diffusion code.

The signal $D_2$ is a sync word that indicates the ordinal number of the frame in the super frame. As shown in FIG. 3, the signal $D_2$ is a frequency-diffused modulated signal generated by diffusing, with the sync diffusion code, eight identical 4-bit binary numbers. The signal $D_2$ can have five values ranging, for example, from 0×0 to 0×5. These five values correspond to the six frames that constitute one super frame.

The signals $D_3$ to $D_{50}$ have been generated by effecting byte interleaving and convolution coding on data, then diffusing the data, thus generating a frequency-diffused modulated signal, and finally dividing the signal every 125 μsec. The data diffused consists, as shown in FIG. 4, identification data (8 bits), a receiver-starting signal (1 bit), CDM-channel data (568 bits), data (48 bits) added when the receiver is started, CRC check bits (16 bits) for correcting errors, and bytes (128 bits) for checking a Reed-Solomon (RS) code.

The identification data identifies the contents of the data that follows it. It is defined as is shown in, for example, Table 1.

TABLE 1

| Value | Contents of data |
| --- | --- |
| 0000000 | Not allocated |
| 0000001–0011111 | Reserved |
| 0100000 | Composed of CDM channel-configuration data and receiver-starting signal |
| 0100001–1111110 | Reserved |
| 1111111 | Not allocated |

The receiver-starting signal causes the receiver to start operating in case of emergency. For example, this one-bit signal is set at "1" to start the receiver. In any other case, the signal is set at "0"

As shown in FIG. 5, the CDM-channel data (568 bits) is composed of a start CDM channel number (8 bits) and ten CDM channel-configuration data items (56×10 bits). The CDM channel-configuration data items correspond to ten channels, respectively. Each CDM channel-configuration data item (56 bits) is composed of interleave mode (4 bits), convolution mode (4 bits), TS-ID (16 bits), reserved state (3 bit), PID minimum value (13 bits), version number (3 bits), and PID maximum value (13 bits).

The start CDM channel number indicates the CDM channel designated by the first CDM channel-configuration data item contained in the CDM-channel data. The nth CDM channel-configuration data item designates the start CDM channel number +n−1.

The interleave mode is data that designates the interleave size of the CDM channel. This mode can have, for example, the values shown in the following Table 2.

TABLE 2

| Value | Interleave Size |
| --- | --- |
| 0000 | 0 |
| 0001 | 53 |
| 0010 | 109 |
| 0011 | 218 |
| 0100 | 436 |
| 0101 | 654 |
| 0110 | 981 |
| 0111 | 1308 |
| 1000–1111 | Reserved |

The convolution mode is data that defines the ratio of encoding the convolution code of the CDM channel. It can have, for example, the values shown in Table 3.

TABLE 3

| Value | Ratio of encoding convolution code |
| --- | --- |
| 0000 | Reserved |
| 0001 | Reserved |
| 0010 | Encoding ratio of 1/2 |
| 0011 | Encoding ratio of 2/3 |
| 0100 | Encoding ratio of 3/4 |
| 0101 | Encoding ratio of 5/6 |
| 0110 | Encoding ratio of 7/8 |
| 0111–1110 | Reserved |
| 1111 | No allocation system |

TS-ID is data that represents the number of the transport stream to be transmitted through the CDM channel. This data is, for example, 0xFFFF when there is no data to be transmitted through the CDM channel.

The reserved state is a storage area that can be used as an extension area in the future.

The PID minimum value is data representing the smallest value for the PID range of the TS packet to be transmitted through the CDM channel. If the same PID range is assigned to two or more CDM channels, the PID minimum value indicates that the CDM channels are bundled together to form a TS.

The version number is data that is incremented by one every time parameters such as interleave length and encoding ratio are updated.

The PID maximum value is data representing the greatest value for the PID range of the TS packet to be transmitted through the CDM channel. If the same PID range is assigned to two or more CDM channels, the PID minimum value indicates that the CDM channels are bundled together to form a TS.

Figure 6:
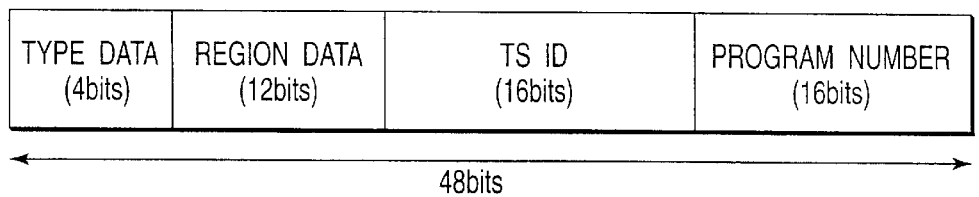
FIG. 6 is a diagram illustrating an example of data added when the receiver is started, that is shown in FIG. 5.
Figure 7:
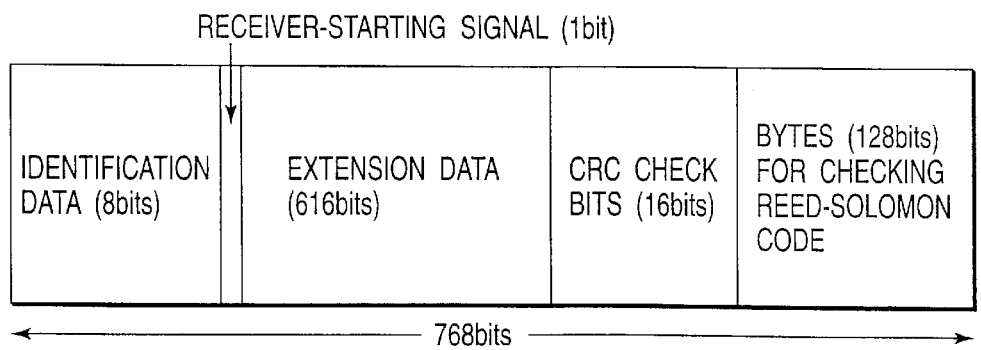
FIG. 7 is a diagram showing another example of the data transmitted in the regions $D_3$ to $D_{50}$ of the sync signal illustrated in FIG. 2A.

The data (48 bits) added when the receiver is started works effectively as auxiliary data for the receiver-starting signal. As shown in FIG. 6, this data is composed of a type data item (4 bits), a region ID data item (12 bits), an emergency program TS-ID (16 bits), and an emergency program number (16 bits). The type data items represents an emergency level or the like. The region ID data item represent the regions to which an emergency program will be broadcast. The emergency program TS-ID identifies the emergency program to be broadcast. The emergency program number indicates the number assigned to the emergency program.

The CRC check bits are data for use in examining data for errors. They are used in cyclic redundancy check (CRC) defined by the polynomial equation of $G(x)=x^{16}+X^{12}+x^5+1$.

The bytes for checking the Reed-Solomon code are used to check, for example, a compressed Reed-Solomon code (96, 80) that has been generated by adding "00h" (159 bytes) to the head of the input data bytes contained in a Reed-Solomon codes (255, 239) defined by, respectively, the polynomial equation of $g(x)=(x+\lambda 0)(x+\lambda^1)(x+\lambda 2)\ldots(x+\lambda 15)$, where=02h and the polynomial equation of $P(x)=x^8+x^4+x^3+x^2+1$.

The signals $D_3$ to $D_{50}$ can be transmitted not only in the form of the CDM channel-configuration data and the data added at the start of the receiver (see FIG. 4), but also in the form of extension data (616 bits) that may consists of data items of various types.

D51 is a signal modulated with, for example, a diffused code for achieving synchronization and is stored in a reserved storage area.

The CDM channel-configuration data, the data added at the start of the receiver, the extension data and the like, all described above, are provided in the form of such a super frame as is illustrated in FIG. 8. In FIG. 8, the mark ·X· indicates a receiver-starting signal.

The format of the control data, described with reference to FIGS. 2A and 2B and FIGS. 3 to 8, has a region of CDM channel-configuration data and a region of extension data. These regions of the control-data format are utilized in the present invention.

In the transmitter shown in FIG. 1, the packet-allocating circuit 21 allocates the input packets to the transmission channels, thus forming groups of packets. The packet groups are supplied to timing-correcting circuits $22_1$ to $22_n$, respectively. Each of the timing-correcting circuits $22_1$ to $22_n$ corrects the time lag that occurs when the packet-allocating circuit 21 extracts packets from the stream of packets input to it. How the time lag is corrected will be explained with reference to FIGS. 9A and 9B.

FIGS. 9A and 9B show how the kth timing-correcting circuit $22_k$ processes the packets input to it and having PIDs of $a_K$ to $b_K$. The packets having PIDs of $a_K$ to $b_K$ may not have the same time positions as they have in the packet stream input to the packet-allocating circuit 21. Therefore, they may not be transmitted through the transmission channel #k, with those time position preserved. Hence, the timing-correcting circuit $22_k$ shifts the transmission timing of each packet. If the packets contain timing data (time management data) each, the timing-correcting circuit $22_k$ changes the timing data in each packet. If necessary, null packets are inserted in order to adjust the rate of transmitting packets. A typical example of the timing data is PCR (Program Clock Reference) data.

The packets output from the timing-correcting circuits $22_1$ to $22_n$ are supplied to scramble circuit $23_1$ to $^{23}n$, respectively. In each scramble circuit, the packets are scrambled with a prescribed scramble key. The packets thus scrambled in the scramble circuit $23_1$ to $_{23}n$ are supplied to error-correcting encoder circuit $24_1$ to $24_n$, respectively. The above-mentioned control data is supplied from the to an error-correcting encoder circuit $24_0$.

The error-correcting encoder circuit $24_0$ performs coding processes, such as Reed-Solomon coding, byte interleaving, convolution coding and bit interleaving, on the control data supplied from the control-data generating circuit $23_0$, thereby to correcting the control data. Similarly, each of the error-correcting encoder circuit $24_1$ to $24_n$ performs these coding processes on the packet output from the corresponding scramble circuit, thereby correcting the packet. The control data corrected is supplied to a CDM modulation circuit $25_0$. The outputs of the error-correcting encoder circuit $24_1$ to $24_n$ are supplied to CDM modulation circuits $25_1$ to $25_n$, respectively. Codes $W_0$ to $W_n$ are input to the modulation circuits $25_0$ to $25_n$, respectively. Using the codes $W_0$, the CDM modulation circuit $25_0$ performs CDM modulation on the control data. Using the codes W1 to Wn, the CDM modulation circuits $25_1$ to $25_n$ perform CDM modulation on the outputs of the error-correcting encoder circuit $24_1$ to $24_n$. The outputs of the CDM modulation circuit $25_0$ to $25_n$ are supplied to a multiplexer/adder circuit 26. The multiplexer/adder circuit 26 multiplexes and adds outputs of the CDM modulation circuit $25_0$ to $25_n$, generating CDM signals. The CDM signals are transmitted from the transmitter through a prescribed transmission path, such as a ground-wave broadcast path, a satellite broadcast path or a cable broadcast path.

FIG. 10 is a block diagram of the receiver incorporated in the packet-transmitting system. In the receiver, the antenna (not shown) receives the CDM signals transmitted from the transmitter. The CDM signals are supplied to a signal-distributing circuit 31. The circuit 31 distributes the CDM signals to n+1 systems. The first system comprises a CDM demodulation circuit $32_0$, an error-correcting circuit $33_0$, and a CDM channel-selecting circuit 35. Each of the other systems comprises a CDM demodulation circuit, an error-correcting circuit, and a descramble circuit. The CDM signals distributed to the n+1 systems are supplied to the CDM demodulation circuits $32_0$ to $32_n$, respectively. The CDM demodulation circuits $32_0$ to $32_n$ receive codes $W_0$ to $W_n$. Using the codes $W_0$ to $W_n$, the CDM demodulation circuits $32_0$ to $32_n$ performs CDM demodulation on the CDM signals. The CDM signals, thus demodulated, are supplied to the error-correcting circuits $33_0$ to $33_n$. The error-correcting circuits $33_0$ to $33_n$ perform coding processes, such as Reed-Solomon decoding, byte de-interleaving, convolution decoding and bit de-interleaving, on the control data supplied from the control-data generating circuit $23_0$, thereby to correcting the CDM signals demodulated in CDM demodulation circuits $32_0$ to $32_n$. The control data and the data packets for n channels are thereby generated.

The control data is supplied to the CDM channel-selecting circuit 35. The CDM channel-selecting circuit 35 extracts group data from the control data. The group data represents various packet IDs. The circuit 35 selects the packet ID of the program the user has designated. Further, the circuit 35 identifies the channel for transmitting the program, in accordance with-the group data containing the packet ID. Then, the circuit 35 generates only the code of the transmission channel thus identified.

That is, the control data designates various packet identifiers (PIDS) that will be transmitted via all CDM channels, as is illustrated in FIG. 8. The CDM channel-selecting circuit 35 receives the data showing these packet identifiers, determines which transmission channel should be used to transmit the packet ID of the program the user has designated, and generates the code Wk of the transmission channel for transmitting the packet ID. Hence, only the CDM signals on this transmission channel are demodulated.

The signals demodulated and selected in the processes described above are supplied to descramble circuits $34_1$ to $24_n$. The descramble circuits $34_1$ to $24_n$ descramble the signals, which are output in the form of packets (i.e., programs desired).

In the packet-transmitting system, the receiver receives the control data, thereby recognizing the packets of each of the groups transmitted through one transmission channel. Hence, the receiver can receive the packets of only the group the user desired. This serves to reduce the size and power consumption of the receiver and, ultimately, the cost of the receiver.

If the packets of one group may exceed the transmission capacity of one channel in terms of data amount, the packet-allocating circuit 21 may allocate these packets to two or more transmission channels. Alternatively, the transmitter and the receiver may be modified as is illustrated in FIG. 11A and FIG. 11B, respectively.

Figure 11A:
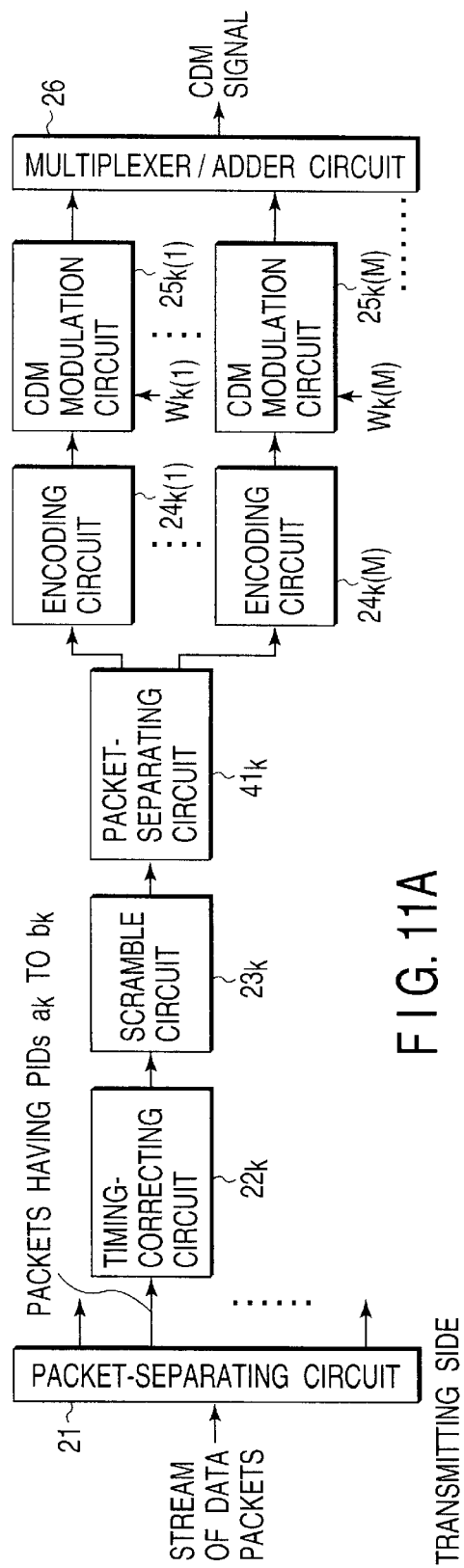
FIGS. 11A and 11B are block diagrams showing the transmitter and receiver, respectively, and explaining how the transmitter and receiver operate when the data of packets of one group is too large to transmit via one transmission channel.

FIG. 11A shows a modified transmitter. If the packets (having PIDs $a_k$ to $a_k$) of one group exceed the transmission capacity of the transmission channel #k in terms of data amount, the stream of packets output from a timing-correcting circuit $22_k$ and scrambled by a scramble circuit $23_k$ is supplied to a packet-allocating circuit $41_k$. The packet-allocating circuit $41_k$ allocates the packets to error-correcting encoder circuits $24_{k(1)}$ to $24_{k(M)}$, thus providing additional transmission channels. The circuits $24_{k(1)}$ to $24_{k(M)}$ correct encode the packets, which are input to CDM modulation circuits $25_{k(1)}$ to $25_{k(M)}$. The circuits $25_{k(1)}$ to $25_{k(M)}$ perform CDM modulation on the packets. The packets thus modulated are supplied to a multiplexer/adder circuit 26. The multiplexer/adder circuit 26 multiplexes and adds the packets output from the CDM modulation circuits $25_{k(1)}$ to $25_{k(M)}$, thereby generating CDM signals. Packet-group data, which shows the group of packets transmitted via the same additional transmission channel, is added to the control data.

Figure 11B:
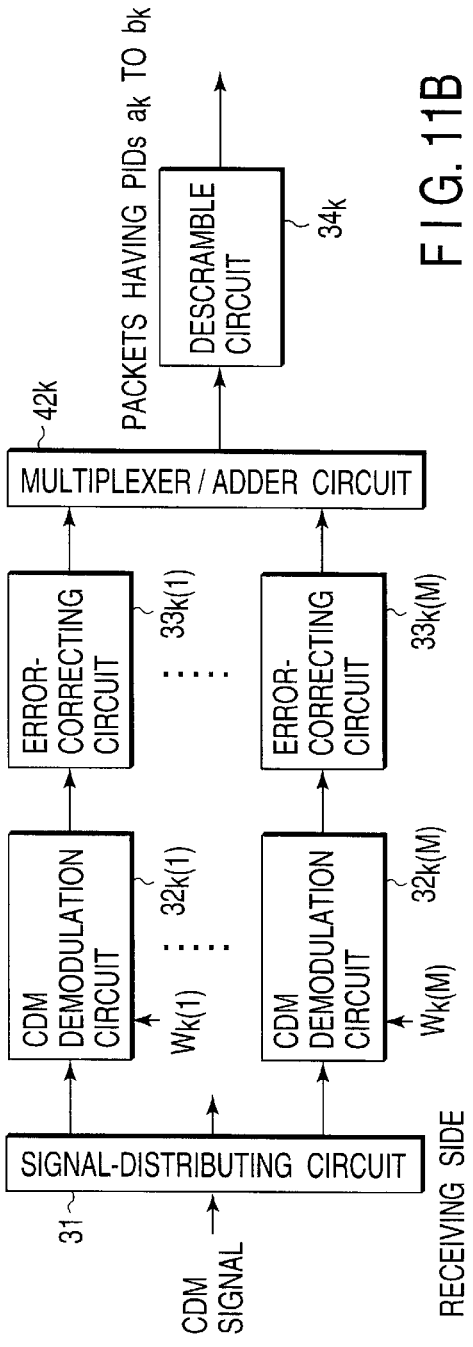

FIG. 11B shows a modified receiver. In the modified receiver, a signal-distributing circuit 31 receives the CDM signals from the transmitter. The circuit 32 distributes the CDM signals in accordance with the additional channels provided in the transmitter. The CDM signals distributed to the channels #k(1) to #k(M) are supplied to CDM demodulation circuits $32_{k(1)}$ to $32_{k(M)}$, respectively. The circuit performs CDM demodulation on the CDM signals. The CDM signals thus demodulated are supplied to error-correcting circuits $33_{k(1)}$ to $33_{k(M)}$. The circuits $33_{k(1)}$ to $33_{k(M)}$ correct the CDM signals, which are supplied to a multiplexer/adder circuit $42_k$. The multiplexer/adder circuit $42_k$ multiplexes and adds the CDM signals, thus generating a stream of packets. The packets are supplied to a descramble circuit $34_k$, descrambled thereby and output from the receiver.

As mentioned above, the packets (having PIDs $a_k$ to $a_k$) of one group output from the packet-allocating circuit 21 exceed the transmission capacity of the transmission channel #k in the transmitter. Therefore, additional transmission channels #k(1) to #k(M) are provided in the transmitter. The timing-correcting circuit $22_k$ inserts null packets and corrects time data, as shown in FIGS. 9A and 9B, in order to transmit packets at a rate M times as high as the initial packet-transmitting rate. The packet-allocating circuit $41_k$ allocates the packets to the additional transmission channels #k(1) to #k(M), first to the channel #k(1), and last to the channel #k(M). The control data sets the PIDs of the packets to be transmitted via the channels #k(1) to #k(M) in the same range. In the receiver, it is known from the control data that a plurality additional channels provided for each transmission channel in the transmitter. The same error-correcting conditions, such as interleave length, encoding ratio, are applied to the error-correcting encoder circuits $24_{k(1)}$ to $24_{k(M)}$.

In the receiver, codes $W_{k(1)}$ to $w_{k(M)}$ are set in order to receive the packets transmitted via the CDM channels. Thus, the receiver receives streams of packets. First, the packets of the first stream are multiplexed, whereby the packets of the first group, which have PIDs $a_k$ to $b_k$ are received. Then, the packets of the second stream are multiplexed, and so forth. Finally, the packets of the last stream are multiplexed. Since the packets are sequentially multiplexed, stream by stream, the same error-correcting conditions (e.g., interleave length, encoding ratio and the like) can be applied to the error-correcting encoder circuits $24_{k(1)}$ to $24_{k(M)}$. This makes it possible to restore the original packet stream in the receiver.

In the system that comprises the modified transmitter and receiver shown in FIG. 11A and 11B, respectively, the data packets of the same group are allocated to a plurality of channels. Therefore, the modified transmitter can transmit the packets of any group even if the packets of the group, i.e., the same program, exceed the transmission capacity of one channel.

In the modified transmitter (FIG. 11A), the input packets are not allocated to channels, in the first-stage component, i.e., the packet-allocating circuit 21. Rather, the packet-allocating circuit $41_k$ allocates the packets additional channels after the packets have been processed by the timing-correcting circuit $22_k$ and the scramble circuit $23_k$. In the modified receiver (FIG. 11B), one descramble circuit and one timing-correcting circuit can process all groups of packets. This helps to prevent the circuit size of the receiver from increasing.

A transmission delay may exists between a transmission channel for transmitting a scramble key and a transmission channel for transmitting packets, due to the difference in characteristic between the error-correction codes used in the respective transmission channels. Some process must be effected in the transmitter to eliminate such a transmission delay. A scramble circuit that is modified to eliminate the transmission delay will be described, with reference to FIG. 12.

Figure 12:
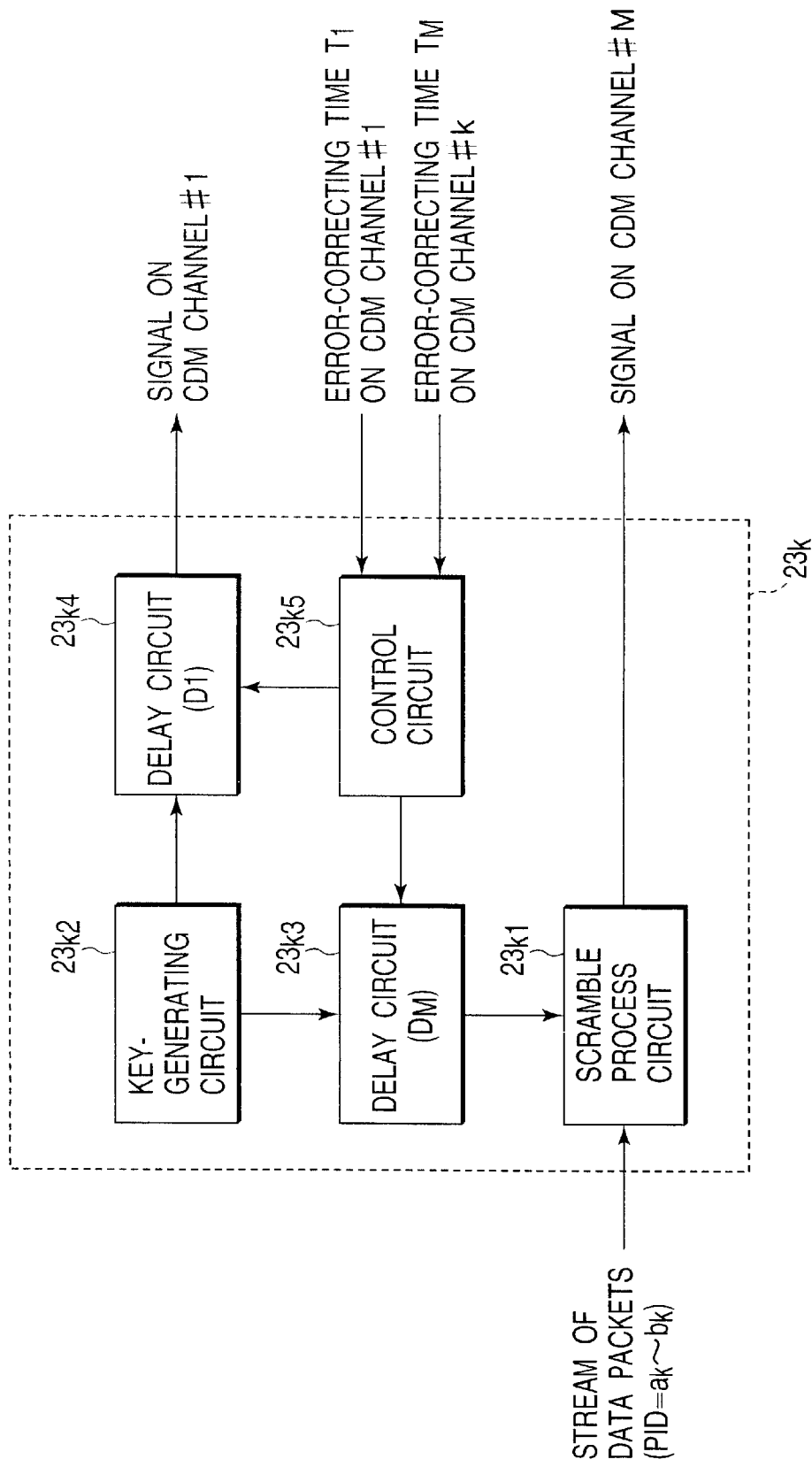
FIG. 12 is a block diagram of the scramble circuit shown in FIG. 1, which can correct a transmission delay.

FIG. 12 is a block diagram. The modified scramble circuit shown in FIG. 12 has the function of eliminating the transmission delay, unlike the scramble circuit $23_k$ illustrated in FIG. 11A. Assume that the delay time of the error-correcting encoder circuit in the transmitter and decoder circuit in the receiver of the CDM channel #1 is T1, whereas the delay time of the error-correcting encoder circuit in the transmitter and decoder circuit in the receiver of the CDM channel #k is $T_M$.

As shown in FIG. 12, the scramble circuit $23_k$ comprises a scramble process circuit $23_{k1}$, a key-generating circuit $23_{k2}$, two delay circuits $23_{k3}$ and $23_{k4}$, and a control circuit $23_{k5}$. In operation, the key-generating circuit $23_{k2}$ generates a scramble key. The scramble key is supplied via the delay circuit $23_{k3}$ to the scramble process circuit $23_{k1}$ and to the delay circuit $23_{k4}$. The scramble process circuit $23_{k1}$ scrambles the stream of packets allocated to the CDM channel #k, by using the scramble key supplied from the key-generating circuit $23_{k2}$. The scramble key supplied to the delay circuit $23_{k4}$ is subjected to time division and multiplexing in the CDM channel #k.

The scramble circuit $23_k$ receives the data items representing the time delay $T_1$ of the CDM channel #1 and the time delay $T_M$ of the CDM channel #k. The data items are input to the control circuit $23_{k5}$. In accordance with the time delays $T_1$ and $T_M$, the control circuit $23_{k5}$ sets the delay times of the delay circuits $23_{k3}$ and $23_{k4}$ at $D_M$ and $D_1$, respectively.

Figure 13:
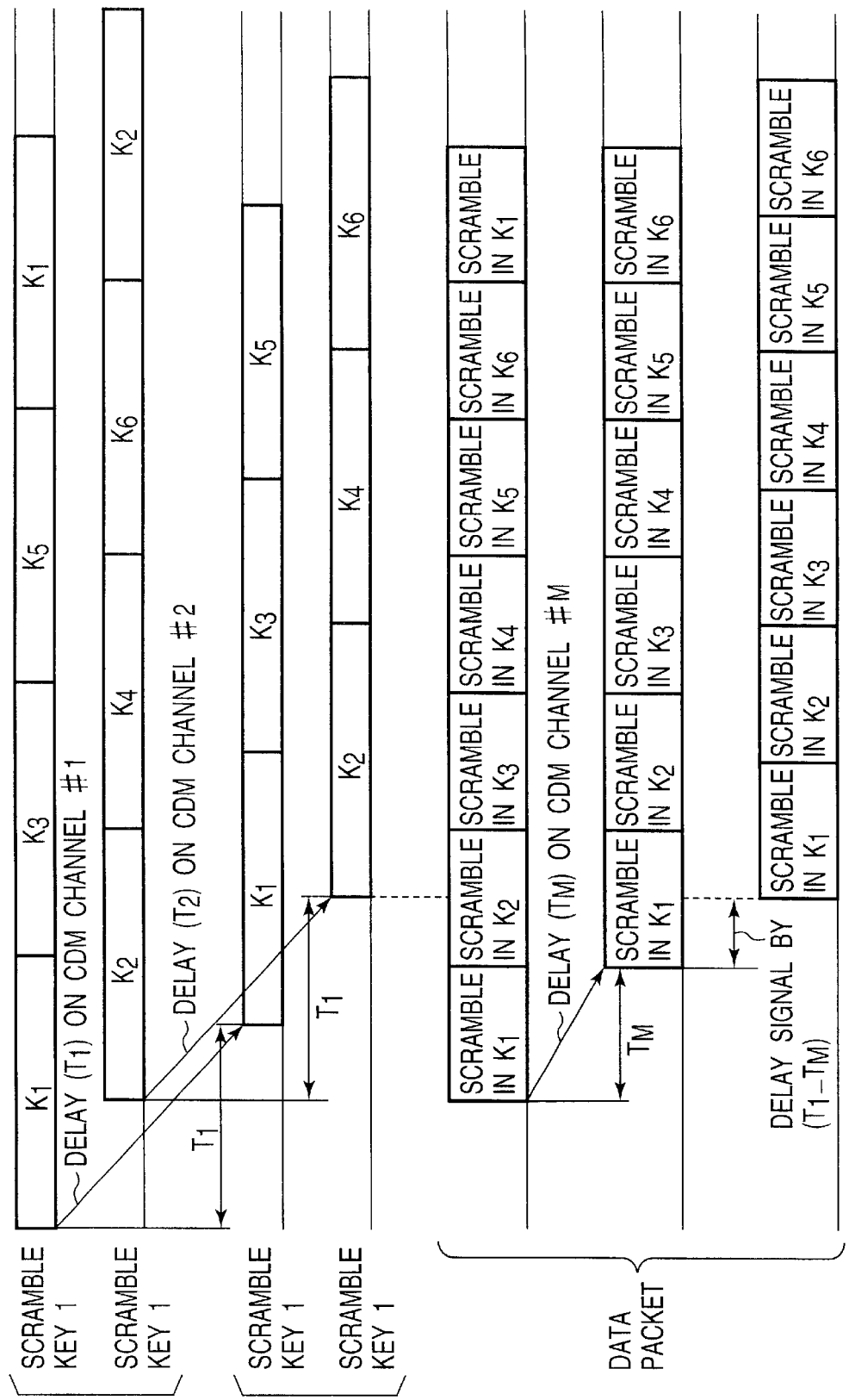
FIG. 13 is a timing chart illustrating the relations that a stream of packets and a scramble key have in the scramble circuit, before and after the transmission delay is corrected.

FIG. 13 is a timing chart showing the timing of transmitting data packets in the case where the delay time $T_1$ is longer than the delay time $T_M$, that is, $T_1>T_M$. As shown in FIG. 13, the timing of transmitting the scramble key is delayed by $(T_1-T_M)$ unless time correction is performed. Hence, the scrambling can be effected at a correct timing, by inserting a delay time $D_M$ that is equal to the difference $(T_1-T_M)$ in the delay circuit $23_{k3}$. In the case where $T_1<T_M$, too, the scrambling can be carried out at a correcting timing, by inserting the delay time $D_1$ that is equal to the difference $(T_M-T_1)$ in the delay circuit $23_{k4}$.

FIG. 14 is a diagram showing a stream of MPEG2-T packets, which are allocated to a plurality of CDM transmission channels. The channel CDM#0 is a pilot channel (i.e., control channel) for transmitting the TSIDS (i.e., groups of PIDS). The channels CDM#1 and CDM#2 transmits charge data (including the scramble-key data), program-arrangement data, program-related data and the like. The channels CDM#4 and CDM#5 are combined together to transmit packets having the same packet ID.

FIG. 15 is a flowchart representing the sequence of selecting a program in the receiver of the packet-transmitting system according to the present invention.

First, when the power-supply switch to the receiver is turned on, the receiver receives a pilot signal through the pilot channel #0 (Step S1). Then, the receiver acquires a table of CDM channels, TSIDs and PIDS, which is shown in FIG. 16A (Step S2). Further, the receiver receives TSIDs through the charging CDM channel #1 (Step S3). The receiver acquires an NIT, which is shown in FIG. 16B (Step S4).

Next, it is determined whether any user program number has been input to the receiver (S5). If NO in Step S5, it is determined whether or not a user program number exists in another TSID of the same 25 MHz band (Step S6). If YES in Step S6, the TSID received is changed (Step S7), and Steps S3 to S6 are repeated. If NO in Step S6, it is determined whether or not a user program number exists in a TSID of another 25 MHz band (Step S8). If YES in Step S8, the transponder is changed to another (Step S9). In this case, Steps S1 to S8 are repeated. If NO in Step S8, the receiver waits for a user program number.

If YES in Step S5, that is, if a user program number has been input to the receiver, the receiver acquires an PAT, which is shown in FIG. 16B (Step S10). The receiver then receives a CDM channel that contains a PMT (PID=p) (Step S11). Further, the receiver acquires a PMT, which is shown in FIG. 16D (Step S12). The receiver acquires an audio packet (PID=x) and a video packet (PID=y) (Step S13). Sound and an image are reproduced from the audio packet and the video packet, respectively (Step S14). Thus ends the sequence of selecting a program in the receiver.

The packet-transmitting system can be used to accomplish, for example, digital broadcasting. If so, in the receiver of the system, the input data packets, i.e., programs (groups), are time-divided and multiplexed. The packets are thereby allocated to a plurality of transmission channels. One or more of the transmission channels are assigned as channels for transmitting control data. Using the control data, the packet-group data, which shows the groups of packets to be transmitted via the transmission channel, respectively, is transmitted from the transmitter to the receiver. In the receiver, the packets of each group are recognized from the control data. The receiver can therefore easily select and receive only the data packet the user desires. This reduces the size and power consumption of the receiver and, ultimately, the cost of the receiver.

Further, a program, i.e., one group of packets, can be transmitted even if the packets exceed the transmission capacity of one channel in terms of data amount. This is because the packets of the same group are allocated to a plurality of transmission channels. In the receiver, it can be known from the control data that these transmission channels are bundled together.

To allocate the packets to a plurality of transmission channels in the transmitter, the timing of each packet in the packet stream may not be maintained and may need to be shifted. Even in this case, the packets can be reproduced in the receiver, merely by correcting the time management data contained in each packet.

The transmission channel for transmitting a scramble key has a delay time and the transmission channel for transmitting packets scrambled may have different delay times because the error-correction codes used in the these channels differ in terms of their characteristic. In this case, the difference in delay time between these channels can be eliminated in the transmitter before the scramble key and the packets are transmitted via the two channels, respectively.

In the embodiment described above, packets are multiplexed and transmitted by the CDM transmission system. Nonetheless, other various multiplex transmission systems, including the OFDM system, can be applied to the present invention.

As has been described, the present invention can provide a packet-transmitting system in which the receiver apparatus receives only the packet the user needs and the parameters of error-correction codes or the characteristics of signals cannot be changed for each packet to achieve broadcasting in various manners desired.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A packet-transmitting system having at least one control-signal transmission channel and a plurality of data-signal transmission channels, said system comprising:
 a transmitter apparatus including:
  packet-allocating section for receiving a stream of packets and allocating groups of packets to the data-signal transmission channels:
  time-dividing/multiplexing section for receiving packet-group data representing the packets allocated to each data-signal transmission channel by the section and for time-dividing and multiplexing the packet-allocating packet-group data to the control-signal transmission channel; and
  multiplexer/adder section for multiplexing a signal in the control-signal transmission channel and signals in the data-signal transmission channels in parallel, thereby to generate signals to be transmitted; and
 a receiver apparatus including:
  signal-distributing section for distributing the signals to a plurality of channels;

group-data acquiring section for reproducing the signal in the data-signal transmission channel from a signal distributed to any channel by the signal-distributing section, thereby to acquire group data about the data-signal transmission channels;

channel-selecting section for selecting a data-signal transmission channel to which a packet group designated is allocated, in accordance with the group data acquired by the group-data acquiring section; and selected-channel reproducing section for reproducing a signal in the data-signal transmission channel selected by the channel-selecting section, from the signals in some of the transmission channels to which the signal-distributing section has distributed the signals and for extracting only the packets of the group designated, said signals in some transmission channels not having been used in the group-data acquiring section.

2. The packet-transmitting system according to claim 1, wherein the packet-allocating section allocates the packets of the same group to a plurality of data-signal transmission channels, and the time-dividing/multiplexing section time-divides and multiplexes the packets thus allocated, as the packet-group data, to the control-signal transmission channel.

3. The packet-transmitting system according to claim 1, wherein the group data represents packet identifiers that the packets have.

4. The packet-transmitting system according to claim 1, wherein the multiplexer/adder section multiplexes the a signal in the control-signal transmission channel and the signals in the data-signal transmission channels, by sections of a code dividing/multiplexing system.

5. The packet-transmitting system according to claim 1, wherein the transmitter apparatus comprises time-management data correcting section for finding a difference between the timing of each packet to be allocated by the packet-allocating section and the timing of the same packet allocated by the packet-allocating section, and for correcting time-management data contained in the packet, in accordance with the difference.

6. The packet-transmitting system according to claim 1, wherein the transmitter apparatus comprises scramble section for scrambling the packets in the data-signal transmission channels and time-dividing a scramble key to one of the data-signal transmission channels.

7. The packet-transmitting system according to claim 6, wherein the scramble section eliminates a difference between a signal delay in the transmission channel for transmitting the scramble key and a signal delay in the transmission channels for transmitting the packets, before the scramble key and packets are transmitted.

8. A transmitter apparatus for use in a packet-transmitting system having at least one control-signal transmission channel and a plurality of data-signal transmission channels, said transmitter apparatus comprising:

packet-allocating section for receiving a stream of packets and allocating groups of packets to the data-signal transmission channels;

time-dividing/multiplexing section for receiving packet-group data representing the packets allocated to each data-signal transmission channel by the packet-allocating section and for time-dividing and multiplexing the packet-group data to the control-signal transmission channel; and multiplexer/adder section for multiplexing a signal in the control-signal transmission channel and signals in the data-signal transmission channels in parallel, thereby to generate signals to be transmitted.

9. A receiver apparatus designed to be used in a packet-transmitting system having at least one control-signal transmission channel and a plurality of data-signal transmission channels, and to receive signals generated by allocating groups of packets to the data-signal transmission channels, by time-dividing and multiplexing, the control-signal transmission channel, packet-group data allocated to each of the data-signal transmission, channel and by multiplexing a signal in the control-signal transmission channel and signals in the data-signal transmission channels in parallel, said receiver apparatus comprising:

signal-distributing section for distributing the signals to a plurality of channels;

group-data-acquiring section for reproducing the signal in the data-signal transmission channel from a signal distributed to any channel by the signal-distributing section, thereby to acquire group data about the data-signal transmission channels;

channel-selecting section for selecting a data-signal transmission channel to which a packet group designated is allocated, in accordance with the group data acquired by the group-data acquiring section; and selected-channel reproducing section for reproducing a signal in the data-signal transmission channel selected by the channel-selecting section, from the signals in some of the transmission channels to which the signal-distributing section has distributed the signals and for extracting only the packets of the group designated, said signals in some transmission channels not having been used in the group-data acquiring section.

* * * * *